United States Patent
Kadoma et al.

(10) Patent No.: US 8,951,696 B2
(45) Date of Patent: Feb. 10, 2015

(54) FUEL ELECTRODE CATALYST FOR FUEL CELL, ELECTRODE/MEMBRANE ASSEMBLY, AND FUEL CELL AND FUEL CELL SYSTEM PROVIDED WITH THE ELECTRODE/MEMBRANE ASSEMBLY

(75) Inventors: Kenji Kadoma, Gunma (JP); Kouji Matsuoka, Gunma (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 896 days.

(21) Appl. No.: 12/078,318

(22) Filed: Mar. 28, 2008

(65) Prior Publication Data

US 2009/0246600 A1 Oct. 1, 2009

(51) Int. Cl.
*H01M 4/92* (2006.01)
*H01M 8/10* (2006.01)
*H01M 4/86* (2006.01)
*H01M 8/06* (2006.01)

(52) U.S. Cl.
CPC .......... *H01M 4/8652* (2013.01); *H01M 4/8657* (2013.01); *H01M 4/92* (2013.01); *H01M 4/926* (2013.01); *H01M 8/0612* (2013.01); *H01M 8/0668* (2013.01); *H01M 8/1004* (2013.01); *H01M 2004/8684* (2013.01); *Y02E 60/50* (2013.01)
USPC ............ 429/523; 429/483; 429/526; 429/527

(58) Field of Classification Search
CPC ...... H01M 4/86–4/928; H01M 8/0662–8/0668
USPC .................. 429/479–490, 523, 524, 526, 527
See application file for complete search history.

(56) References Cited

U.S. PATENT DOCUMENTS

| | | | | |
|---|---|---|---|---|
| 6,300,000 B1 * | 10/2001 | Cavalca et al. | ................ | 429/480 |
| 6,309,769 B1 * | 10/2001 | Haug | ............................. | 429/412 |
| 2001/0053470 A1 * | 12/2001 | Misumi | ........................... | 429/26 |
| 2005/0147867 A1 * | 7/2005 | Cooper et al. | .................. | 429/40 |
| 2005/0214610 A1 * | 9/2005 | Yoshimura et al. | ............. | 429/30 |
| 2006/0257717 A1 * | 11/2006 | Huang | ............................. | 429/44 |
| 2007/0122684 A1 * | 5/2007 | Song | ............................... | 429/40 |

FOREIGN PATENT DOCUMENTS

| | | |
|---|---|---|
| CN | 1885599 A | 12/2006 |
| JP | 9-35736 | 2/1997 |
| JP | 10-270057 | 10/1998 |
| JP | 2000-277137 | 10/2000 |
| JP | 2003-217620 | 7/2003 |
| JP | 2003-217623 | 7/2003 |

OTHER PUBLICATIONS

Chinese Office Action issued in Chinese Patent Application No. 200810005108.4, mailed Jan. 25, 2011.

* cited by examiner

*Primary Examiner* — Jonathan Crepeau
*Assistant Examiner* — Jacob Buchanan
(74) *Attorney, Agent, or Firm* — McDermott Will & Emery LLP

(57) ABSTRACT

A fuel electrode catalyst for fuel cell excellent in CO poisoning resistance, an electrode/membrane assembly using the fuel electrode catalyst for fuel cell, and a fuel cell and a fuel cell system including the electrode/membrane assembly are provided. The fuel electrode catalyst for fuel cell comprises a platinum-ruthenium first alloy catalyst and a second alloy catalyst obtained by partially substituting ruthenium of the platinum-ruthenium first alloy catalyst by a metal lower dissolving potential than ruthenium. The electrode/membrane assembly 7 comprises three layers of a second alloy catalyst layer 3, a first alloy catalyst layer 4, and a ruthenium catalyst layer 5 arranged in this order from a polymer electrolytic membrane 1 side toward a gas diffusion layer 13 side.

13 Claims, 7 Drawing Sheets

FUEL ELECTRODE CATALYST FOR FUEL CELL, ELECTRODE/MEMBRANE ASSEMBLY, AND FUEL CELL AND FUEL CELL SYSTEM PROVIDED WITH THE ELECTRODE/MEMBRANE ASSEMBLY

BACKGROUND OF THE INVENTION

1. Field of the Invention

The present invention relates to a fuel electrode catalyst for fuel cell, an electrode/membrane assembly, and a fuel cell and a fuel cell system provided with the electrode/membrane assembly, which are excellent in carbon monoxide (CO) poisoning resistance.

2. Description of the Related Art

In recent years, fuel cells have attracted attention as a high-efficiency generator. The fuel cells are roughly classified, according to the type of electrolyte used, into a low-temperature operating fuel cell such as alkali type, polymer type or phosphoric acid type and a high-temperature operating fuel cell such as molten carbonate type or solid oxide type. Among them, a polymer fuel cell using an ion-conductive polymer electrolyte membrane as the electrolyte has attracted particular attention as power sources for various purposes including domestic use since a high power density can be obtained in spite of a small size thereof.

FIG. 7 is an exploded sectional view showing a basic structure of a unit cell in such polymer type fuel cell.

An electrode/membrane assembly is formed by bonding an air electrode catalyst layer 32 and a fuel electrode catalyst layer 33 each formed using a platinum carbon-supported catalyst to both principal surfaces of a polymer electrolyte membrane 31, respectively.

An air electrode-side gas diffusion layer 34 and a fuel electrode-side gas diffusion layer 35 each having a structure in which carbon paper is coated with a mixture of carbon black and polytetrafluoroethylene (PTFE) are disposed in opposition to the air electrode catalyst layer 32 and to the fuel electrode catalyst layer 33, respectively. An air electrode 36 and a fuel electrode 37 are thereby constituted.

The gas diffusion layers 34 and 35 have the function of conducting electric current to the outside in addition to the function of passing an oxidizer gas (e.g., air) and a fuel gas, for example, mainly hydrogen, an alcoholic fuel such as methanol or a reformed gas mainly composed of hydrogen which is obtained by reforming a hydrocarbon fuel such as natural gas, city gas, LPG or butane. A unit cell 41 is formed by sandwiching the gas diffusion layer 34 and the gas diffusion layer 35 by one set of separators 40 formed of a conductive and gas-impermeable material, each of the separators including a gas flow passage 38 for distributing reaction gas, formed on the principal surface facing the gas diffusion layer 34 or the gas diffusion layer 35, and a cooling water flow passage 39 for distributing cooling water, formed on the other principal surface.

FIG. 8 is a sectional view showing a basic structure of a polymer fuel cell stack. A number of unit cells 41 are laminated, and the laminated cells are sandwiched between collector plates 42 and further between insulating plates 43 for electric insulation and thermal insulation, clamped by clamp plates 44 for retaining the laminated state with loading, and fastened together by bolts 45 and nuts 47, with the clamp load being applied by disc springs 46.

When a fuel gas containing hydrogen and an oxidizer gas containing oxygen such as air are supplied to the fuel electrode 37 and to the air electrode 36, respectively, a fuel electrode reaction for resolving a hydrogen molecule to hydrogen ions (protons) and electrons takes place in the fuel electrode 37, and an electrochemical reaction for generating water from the oxygen, the hydrogen ions and the electrons takes place in the air electrode 36, whereby electric power is consequently supplied to a load by the electrons moving in an external circuit from the fuel electrode to the air electrode, while water is generated on the air electrode side.

Fuel electrode; $H_2 \rightarrow 2H^+ + 2e^-$  (Fuel electrode reaction)

Air electrode; $2H^+ + (1/2)O_2 + 2e^- \rightarrow H_2O$  (Air electrode reaction)

Overall; $H_2 + (1/2)O_2 \rightarrow H_2O$

The hydrocarbon fuel such as natural gas or city gas contains sulfur, and a reformed gas mainly composed of hydrogen, which is obtained by reforming such fuel, contains carbon monoxide (CO). Therefore, when such reformed gas is directly supplied to the fuel electrode of a cell, platinum catalyst is poisoned thereby. The poisoning of the catalyst by CO inhibits the reaction in the fuel electrode, resulting in deterioration of cell performance.

Therefore, a fuel cell power generation system as a small power source including a desulfurizer, a reformer (RF), a CO converter (SH) for converting carbon monoxide, a CO remover (PROX) for removing carbon monoxide, and a fuel cell for generating electric power through chemical reaction of the resulting hydrogen (reformed gas) with an oxidizer such as atmospheric oxygen is proposed (refer to, for example, Japanese Patent Application Laid-Open Nos. 2003-217620, 2003-217623, and 2000-277137).

FIG. 9 shows a conventional fuel cell power generation system.

A conventional fuel cell power generation system 51 comprises, as shown in FIG. 9, a desulfurizer 54, which desulfurizes hydrocarbon fuel gas such as natural gas, city gas, methanol, LPG or butane supplied thereto through a raw fuel gas supply line 53 provided with a raw fuel gas on-off valve 52; a fuel reforming device 60 [reformer (RF)/CO converter (SH)/CO remover (PROX)], which reforms the desulfurized fuel gas desulfurized in the desulfurizer 54 and then supplied thereto through a desulfurized gas supply line 59 provided with a desulfurized fuel gas on-off valve 55 into a hydrogen-rich reformed gas with reduced CO concentration by use of steam vaporized in a vaporizer 58 by supplying water thereto through a shut-off valve 57 and then supplied thereto through a check valve 59; and a fuel cell 63, which generates an electric power by electrochemically reacting the reformed gas obtained in the fuel reforming device 60 and then supplied to a fuel electrode (AN) through a reformed gas supply line 62 provided with a reformed gas on-off valve 61 with atmospheric oxygen supplied to an air electrode (CA).

The fuel cell power generation system 51 further comprises, as shown in FIG. 9, a combustion raw fuel gas supply line 66 branched from a branch part 64 of the raw fuel gas supply line 53 at the downstream of the raw fuel gas on-off valve 52 to supply part of the raw fuel gas to a combustion part (burner) 65 of the fuel reforming device 60 in order to supply a heat quantity necessary for maintaining the reforming reaction, because the reaction by steam reforming is an endothermic reaction. Hydrogen gas (offgas) discharged from the fuel cell 63 is supplied to the combustion part (burner) 65 through an offgas line 68 provided with a shut-off valve 67.

On the other hand, for avoiding the poisoning of the platinum catalyst by CO, it is considerable to use, as the catalyst for fuel electrode, a catalyst hardly poisoned by CO, for example, a platinum-ruthenium catalyst.

Ruthenium detoxifies CO. Therefore, the platinum-ruthenium catalyst is remarkably improved in the resistance to CO poisoning, compared with a single catalyst of platinum, and especially a platinum-ruthenium catalyst with ruthenium content of 50 weight % or more can exhibit a remarkable effect on the reduction in voltage by poisoning (refer to Japanese Patent Application Laid-Open No. 09 (1997)-35736).

However, ruthenium is low in hydrogen oxidation activity required as natural electrode reaction, compared with platinum. Although such platinum-ruthenium catalyst with ruthenium content of 50 weight % or more as described above is excellent in CO poisoning resistance, the resulting voltage is lower than that in a cell using the single catalyst of platinum when fuel composed of only hydrogen is used.

Therefore, a solid polymer type fuel cell comprising a fuel electrode having a first platinum-ruthenium catalyst layer with ruthenium content of less than 50 weight % on the side contacting with the polymer electrolyte membrane and a second platinum-ruthenium catalyst layer with ruthenium content of 50 weight % or more on the gas diffusion layer side is proposed (refer to Japanese Patent Application Laid-Open No. 10 (1998)-270057).

However, it was found that the platinum-ruthenium catalyst of the fuel electrode becomes single platinum by elution of ruthenium therein during operation using a fuel gas such as CO-containing hydrogen gas or an organic fuel such as methanol as the fuel, for example, during long-term operation involving frequently repeated starting and stoppage of the fuel cell. As a result, the CO resistance is deteriorated. Further, the dissolved and separated ruthenium can arrive at the air electrode through the electrolyte layer and inhibits oxygen reduction that is a reaction in the air electrode.

Therefore, such conventional electrode/membrane assembly with platinum-ruthenium catalyst and fuel cell power generation system using a fuel cell provided therewith could not perform stable generation of electric power due to the deterioration of CO poisoning resistance by elution of ruthenium and the inhibition of oxygen reduction that is the air electrode reaction by the eluted ruthenium, and thus lacked reliability.

SUMMARY OF THE INVENTION

It is a first object of the present invention to provide a fuel electrode catalyst for fuel cell excellent in CO poisoning resistance and in suppression of deterioration of CO resistance.

A second object of the present invention is to provide an electrode/membrane assembly, formed by disposing a fuel electrode and an air electrode on both principal surfaces of a polymer electrolyte membrane, respectively, and bonding the electrodes to the polymer electrolyte membrane, which uses the fuel electrode catalyst for fuel cell excellent in CO poisoning resistance and in suppression of deterioration of CO resistance in a fuel electrode.

A third object of the present invention is to provide a fuel cell comprising this electrode/membrane assembly.

A fourth object of the present invention is to provide a fuel cell system, using a reformed gas as a fuel supplied to a fuel electrode.

A fifth object of the present invention is to provide a fuel cell system, using an organic fuel as a fuel supplied to a fuel electrode.

A first aspect of the invention relates to a fuel electrode for fuel cell with CO poisoning resistance difficult to deteriorate during long-term use of a fuel containing CO, comprising a ternary alloy catalyst obtained by partially substituting ruthenium of platinum-ruthenium alloy by a metal lower dissolving potential than ruthenium.

A second aspect of the invention relates to a fuel electrode catalyst for fuel cell, comprising a platinum-ruthenium first alloy catalyst and a second alloy catalyst obtained by partially substituting ruthenium of platinum-ruthenium alloy by a metal lower dissolving potential than ruthenium.

In the first and second aspects of the invention, the lower dissolving potential metal referred herein means a metal having an elution-related standard electrode potential lower than that of ruthenium.

According to these aspects, ruthenium is never eluted since the metal lower dissolving potential than ruthenium is present in contact with ruthenium and thus eluted first during operation. Therefore, since the ruthenium is trapped and stayed within the fuel electrode catalyst layer, the catalytic activity of the fuel electrode can be maintained without deterioration of CO poisoning resistance, and further inhibition of oxygen reduction that is the air electrode reaction by eluted ruthenium can be prevented.

In a third aspect of the invention, it is included in the first or second aspect of the invention that the fuel electrode catalyst for fuel cell is supported by at least one selected from the group consisting of acetylene black, ketjen black, furnace black, graphitized carbon, carbon nanotube, and carbon nano-onion.

According to the third aspect of the invention, the electron conductivity of the fuel electrode catalyst layer can be further improved by supporting such a carbonaceous material as a carrier.

In a fourth aspect of the invention, it is included in the first or second aspect of the invention that the metal lower dissolving potential than ruthenium is at least one selected from the group consisting of cobalt, nickel, molybdenum, lead, iron, and tungsten, chromium.

According to the fourth aspect, since such a concrete lower dissolving potential metal is adapted so that the lower dissolving potential metal is eluted earlier than ruthenium in the fuel electrode during operation, the catalytic activity of the fuel electrode can be maintained without deterioration of CO poisoning resistance resulting from elution of ruthenium, and inhibition of oxygen reduction that is the air electrode reaction by eluted ruthenium can be prevented. Further, the lower dissolving potential metal eluted earlier never inhibits the oxygen reduction that is the air electrode reaction.

A fifth aspect of the invention relates to an electrode/membrane assembly for fuel cell, which is formed by bonding a fuel electrode to one principal surface of a polymer electrolyte membrane and an air electrode to the other principal surface thereof, the fuel electrode being a fuel electrode including the catalyst of the second aspect of the invention.

According to the electrode/membrane assembly of the fifth aspect of the invention, the catalytic activity of the fuel electrode catalyst can be maintained with high CO poisoning resistance, and the oxygen reduction that is the air electrode reaction is never inhibited.

In a sixth aspect of the invention, it is included in the fifth aspect of the invention that the metal lower dissolving potential than ruthenium is contained more on the polymer electrolyte membrane side in the catalyst layer thickness direction of the fuel electrode.

According to the electrode/membrane assembly of the sixth aspect of the invention, ruthenium can be trapped more in the fuel electrode catalyst since the metal lower dissolving potential than ruthenium is eluted first during operation of the fuel cell. Therefore, the catalytic activity of the fuel electrode can be maintained without deterioration of CO poisoning resistance, and the oxygen reduction that is the air electrode reaction is never inhibited.

In a seventh aspect of the invention, it is included in the fifth aspect of the invention that three layers of a second alloy catalyst layer, a first alloy catalyst layer and a ruthenium catalyst layer are arranged in this order from the polymer electrolyte membrane side toward a gas diffusion layer side.

According to the electrode/membrane assembly of the seventh aspect of the invention, the deterioration of CO poisoning resistance of the fuel electrode can be further suppressed since the ruthenium in the ruthenium catalyst layer is used as a supply source of ruthenium to the second alloy catalyst layer or the first alloy catalyst layer.

An eighth aspect of the invention relates to a fuel cell, which comprises the electrode/membrane assembly of the fifth aspect of the invention.

According to the fuel cell of the eighth aspect of the invention, stable generation of electric power can be performed with high reliability since the catalytic activity of the fuel electrode can be maintained with high CO poisoning resistance, and the oxygen reduction that is the air electrode reaction is never inhibited.

A ninth aspect of the invention relates to a fuel cell system, which uses a fuel containing a small amount of CO as a fuel supplied to the fuel electrode of a fuel cell comprising the electrode/membrane assembly of the fifth aspect of the invention. The small amount of CO referred herein means an amount of 0.1 ppm or more and 1000 ppm or less.

A tenth aspect of the invention relates to a fuel cell system, which uses a fuel containing a small amount of CO as a fuel supplied to a fuel electrode of a fuel cell comprising the electrode/membrane assembly of the fifth aspect of the invention.

According to the ninth aspect of the invention, even if a fuel containing a small amount of CO, for example, a reformed gas is used as the fuel supplied to the fuel electrode, the catalytic activity of the fuel electrode catalyst can be maintained with high CO poisoning resistance, and the oxygen reduction that is the air electrode reaction is never inhibited. Therefore, stable generation of electric power can be performed with high reliability.

According to the tenth aspect of the invention, even if an organic fuel containing a small amount of CO such as methanol is used as the fuel supplied to the fuel electrode, the catalytic activity of the fuel electrode catalyst can be maintained with high CO poisoning resistance, and the oxygen reduction that is the air electrode reaction is never inhibited. Therefore, stable generation of electric power can be performed with high reliability.

DETAILED DESCRIPTION OF PREFERRED EMBODIMENTS

Referring to the accompanying drawings, the present invention will be described in detail based on preferred embodiments.

Figure 1:
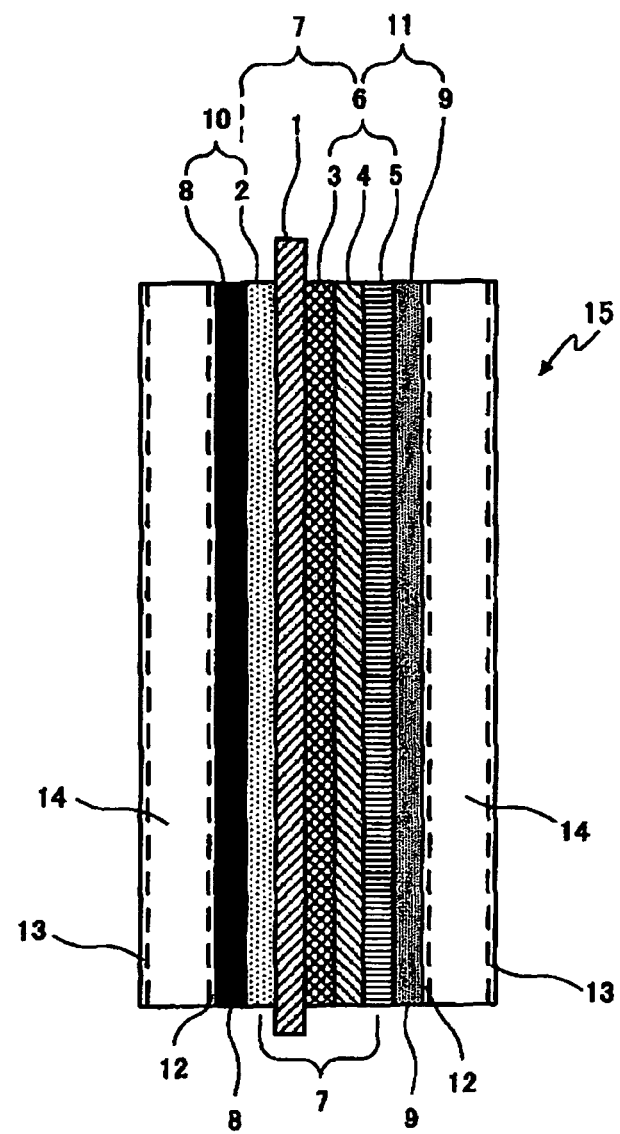
FIG. 1 is an illustrative view, schematically showing an electrode/membrane assembly according to the present invention and one example of a unit cell provided therewith.

FIG. 1 schematically illustrates an electrode/membrane assembly according to the invention and one example of a unit cell provided therewith.

In FIG. 1, denoted at 1 is a polymer electrolyte membrane, and an electrode/membrane assembly 7 is formed by bonding an air electrode catalyst layer 2 formed using a platinum carbon-supported catalyst to one air electrode-side principal surface of the polymer electrolyte membrane 1, and bonding a fuel electrode catalyst layer 6 to the other fuel electrode-side principal surface of the polymer electrolyte membrane 1, the fuel electrode catalyst layer 6 being formed by laminating, in order from the polymer electrolyte membrane side, a second alloy catalyst layer 3 formed using a second alloy catalyst obtained by partially substituting ruthenium of a platinum-ruthenium first alloy by a metal lower dissolving potential than ruthenium, a first alloy catalyst layer 4 formed using the platinum-ruthenium first alloy catalyst, and a ruthenium catalyst layer 5 formed using a ruthenium catalyst.

An air electrode-side gas diffusion layer 8 and a fuel electrode-side gas diffusion layer 9 each having a structure in which carbon paper is coated with a mixture of carbon black and polytetrafluoroethylene (PTFE) are disposed on and bonded to the air electrode catalyst layer 2 and the fuel electrode catalyst layer 6, respectively. An air electrode 10 and a fuel electrode 11 are formed thereby, respectively.

The gas diffusion layer 8 and the gas diffusion layer 9 allow passage of an oxidizer gas (e.g., air) and passage of a fuel gas, for example, mainly hydrogen, an alcoholic fuel such as methanol, or a reformed gas mainly composed of hydrogen which is obtained by reforming a hydrocarbon fuel such as natural gas, city gas, LPG or butane, respectively. The fuel gas can contain steam for wetting. The reformed gas or the like, which is mainly composed of hydrogen gas, may contain CO (carbon monoxide) in a small amount, for example, ranging from 1 ppm to 1% by mass of CO (carbon monoxide), generally, ranging from 0.1 ppm to 1000 ppm. The gas diffusion layer 8 and the gas diffusion layer 9 may perform further electron conduction.

A unit cell 15 is formed by sandwiching the gas diffusion layer 8 and the gas diffusion layer 9 by a set of separators 14 formed of a conductive and gas-impermeable material, the separators including gas flow passages 12 for distributing reaction gas, provided on respective principal surfaces facing the gas diffusion layer 8 and the gas diffusion layer 9, and cooling water passages 13 for distributing cooling water, provided on the other principal surfaces.

In a ternary alloy catalyst obtained by partially substituting ruthenium of platinum (Pt)-ruthenium (Ru) alloy by a metal (M) lower dissolving potential than ruthenium, the ratios of the three components are Pt=10 to 95; Ru=1 to 90; and M=0.001 to 30 by mass, preferably, M=0.5 to 15, wherein Pt+Ru+M=100.

Based on the above, for example, a ternary catalyst with Pt:Ru:M=1:0.9:0.1 by mass can be given.

In a binary alloy catalyst of platinum (Pt) and ruthenium (Ru), the ratios of the two components are Pt=10 to 95 and Ru=5 to 90 by mass. In the binary catalyst, the ratio of Ru is preferably equal to or more than that of Pt, wherein Pt+Ru=100.

Based on the above, for example, a binary catalyst with Pt:Ru=1:1 by mass can be given.

The alloy catalyst to be used in the present invention can be produced by a known method such as metallurgical melt mixing or ion implant.

The fuel electrode 11 is formed, for example, through the following process.

Slurry of carbon powder and polytetrafluoroethylene (PTFE) dispersion is applied onto a surface of a carbon porous body such as carbon paper followed by sintering in the atmosphere to thereby form the fuel electrode-side gas diffusion layer 9.

Slurry prepared by mixing a ruthenium carbon-supported catalyst, a fluorine-based polymeric solution and water together is applied onto a surface of the fuel electrode-side gas diffusion layer 9, slurry prepared by mixing a platinum-ruthenium alloy/carbon-supported catalyst (first alloy catalyst), a fluorine-based polymeric solution and water together is applied thereon, and slurry prepared by mixing a second alloy catalyst obtained by partially substituting ruthenium of the first alloy catalyst by a metal M lower dissolving potential than ruthenium, a fluorine-based polymeric solution and water together is further applied thereon followed by drying to hereby form the fuel electrode 11 provided with three layers of the ruthenium catalyst layer 5, the first alloy catalyst layer 4, and the second alloy catalyst layer 3 arranged in this order from the fuel electrode-side gas diffusion layer 9.

On the other hand, the air electrode 10 is formed, for example, through the following process.

Slurry of carbon powder and PTFE dispersion is applied onto a surface of a carbon porous body such as carbon paper, and the resulting porous body is sintered in the atmosphere to thereby form the air electrode-side gas diffusion layer 8. Slurry prepared by mixing a platinum/carbon-supported catalyst, a fluorine-based polymeric solution and water together is applied onto one surface of the air electrode-side gas diffusion layer 8 followed by drying to thereby form the air electrode 10 provided with the air electrode catalyst layer 2.

The thus-obtained fuel electrode 11 and air electrode 10 are disposed across the polymer electrolyte membrane 1 and hot-pressed so that the second alloy catalyst layer 3 of the fuel electrode 11 contacts with one surface of the polymer electrolyte membrane 1 and the air electrode catalyst layer 2 of the air electrode 10 contacts with the other surface of the polymer electrolyte membrane 1 to form the electrode/membrane assembly 7. A structure provided with the electrode/membrane assembly 7 is further sandwiched by the set of separators 14 composed of a conductive and gas-impermeable material, including the gas flow passages 12 for distributing reaction gas, provided on the respective principal surfaces facing the gas diffusion layer 8 and the gas diffusion layer 9 and cooling water flow passages 13 for distributing cooling water, provided on the other principal surfaces, through sealants not shown, and further clamped in the laminating direction to thereby form a unit cell 15.

The concentration of platinum in the second alloy contacting with the polymer electrolyte membrane is preferably set to be equal to or more than the concentration of platinum in the first alloy.

Concrete examples of the polymer electrolyte membrane used in the present invention include a cation conductive membrane composed of a polystyrene-based cation-exchange membrane having sulfonic group, a mixed membrane of fluorocarbon sulfonic acid and polyvinylidene fluoride, a grafted body of trifluoroethylene with fluorocarbon matrix, or a perfluorocarbon sulfonic acid membrane (made by DuPont, Trade name: Nafion membrane). Such a polymer electrolyte membrane has a proton exchange group in the molecule and functions, when the water content is saturated, as a proton conductive electrolyte with a specific resistance of 20 $\Omega m^2$ or less at ordinary temperature.

Although the separator used in the present invention is not particularly limited as long as it is formed of a conductive and gas-impermeable material, a carbonaceous material such as carbon or a carbon composite material composed of carbon and resin, or a metallic material, either of which is excellent in conductivity, strength, durability and the like and can be subjected to pressure molding or injection molding allowing reduction in cost by mass production can be preferentially used.

From the viewpoint of gas impermeability and mechanical strength, the thickness of the separator can be set, for example, to about 1 to 2 mm for the metallic material, and to about 2 to 5 mm for the carbonaceous material.

Although the first alloy catalyst layer 4 and the second alloy catalyst layer 3 are separately laminated in the above-mentioned embodiment, a mixed catalyst prepared by mixing the first alloy catalyst with the second alloy catalyst can be used to simply provide one layer of the mixed alloy catalyst. In this case, the mixing ratio (by mass) of the first alloy catalyst to the second alloy catalyst is preferably set to first alloy catalyst:second alloy catalyst of 10:1 to 10 according to the concentration of CO in the fuel supplied to the fuel electrode 11.

In each of the polymer electrolyte membrane 1, the air electrode catalyst layer 2, the second alloy catalyst layer 3, the first alloy catalyst layer 4, the ruthenium catalyst layer 5 and the like constituting the electrode/membrane assembly 7, layer thickness, catalyst content and the like are not particularly limited.

The effect of the present invention can be exhibited by setting the ratio of thickness of the first layer (second alloy catalyst layer 3) to the second layer (first alloy catalyst layer 4) to first layer/second layer=1/100 or more by thickness. Namely, when the first layer/second layer ratio is less than 1/100, the effect of suppressing CO resistance deterioration after 20000 hours is 1 mV or less, or hardly observed.

It has been confirmed that when the thickness of the first layer is excessively increased over first layer/second layer thickness ratio of 2/1, the initial performance of the resulting fuel cell is deteriorated.

Accordingly, the thickness ratio of the first layer to the second layer is desirably set to first layer:second layer=1:50 to 1:1 in consideration for durability, initial performance and cost performance. Particularly, the highest effect is exhibited at first layer:second layer=1:10.

The thickness of the ruthenium catalyst layer 5 is not particularly limited since the purpose of the layer 5 is replenishment of eluted ruthenium. However, the thickness thereof is generally set to be about equal to that of the first layer in consideration for cost or the like.

In the above-mentioned embodiment, thus, the thickness of each layer is preferably set to second alloy catalyst layer 3:first alloy catalyst layer 4:ruthenium catalyst layer 5=1:10:1.

Although the carbon-supported catalyst is exemplified in the above embodiment, at least one selected from the group consisting of acetylene black, ketjen black, furnace black, graphitized carbon, carbon nanotube, and carbon nanoonion can be preferably used as the carbon in the present invention since it can improve the electron conductivity of the fuel electrode catalyst layer.

The carbon nanoonion has a turbostratic structure of graphite-like structures most of which are layered and developed in an onion-like shape, further includes amorphous structures and a few graphitized structures.

In the fuel cell system of the present invention, even if a reformed gas is used as the fuel supplied to the fuel electrode of the fuel cell, the electrode/membrane assembly of the present invention can maintain the catalytic activity of the fuel electrode catalyst with high CO poisoning resistance, and further prevent inhibition of oxygen reduction that is the air electrode reaction. Therefore, stable generation of electric power can be performed with high reliability.

In the fuel cell system of the present invention, even if an organic fuel such as methanol is used as the fuel supplied to the fuel electrode of the fuel cell, the electrode/membrane assembly of the present invention can maintain the catalytic activity of the fuel electrode catalyst with high CO poisoning resistance and further prevent inhibition of oxygen reduction that is the air electrode reaction, and amplification of the oxygen reducing efficiency of platinum by the lower dissolving potential metal eluted instead of ruthenium can be also expected. Therefore, generation of electric power can be performed with high reliability.

First Embodiment

A fuel cell 110 used in a domestic fuel cell cogeneration system 100 as one example of the fuel cell system of the present invention will be described in reference to FIG. 2.

Figure 3:
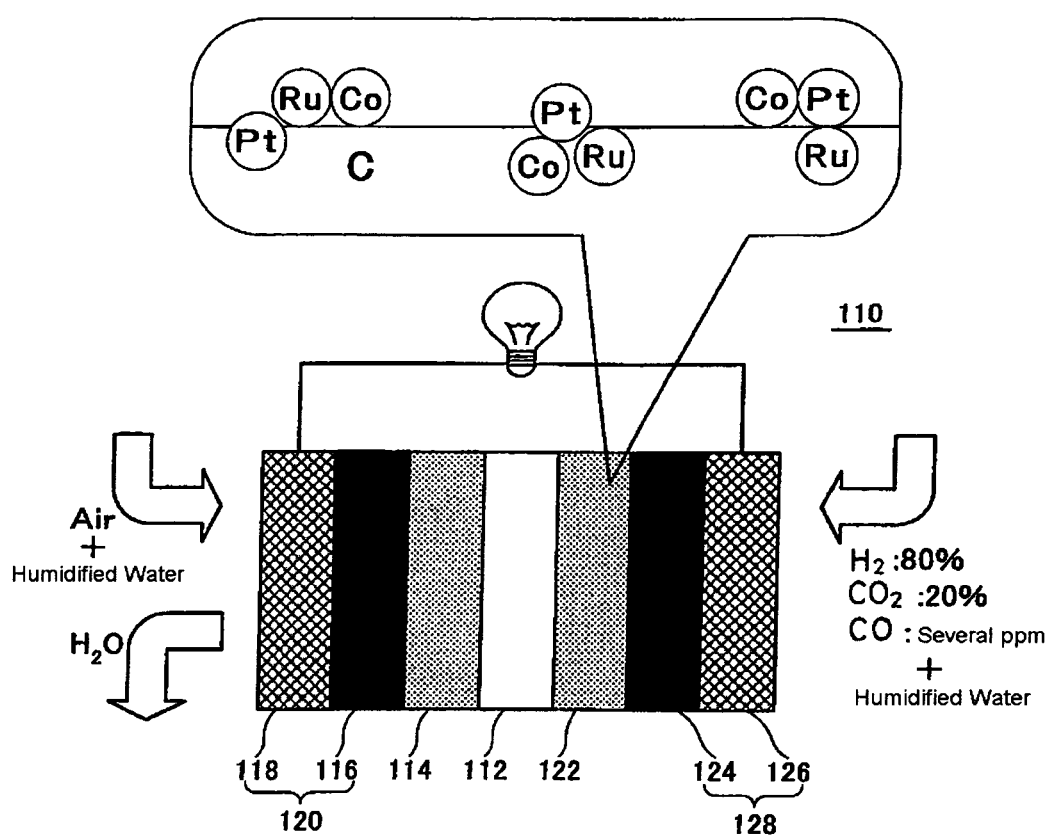
FIG. 3 is a sectional illustrative view of an electrode/membrane assembly with gas diffusion layer.

FIG. 3 is a sectional illustrative view of an electrode/membrane assembly with gas diffusion layer.

Figure 2:
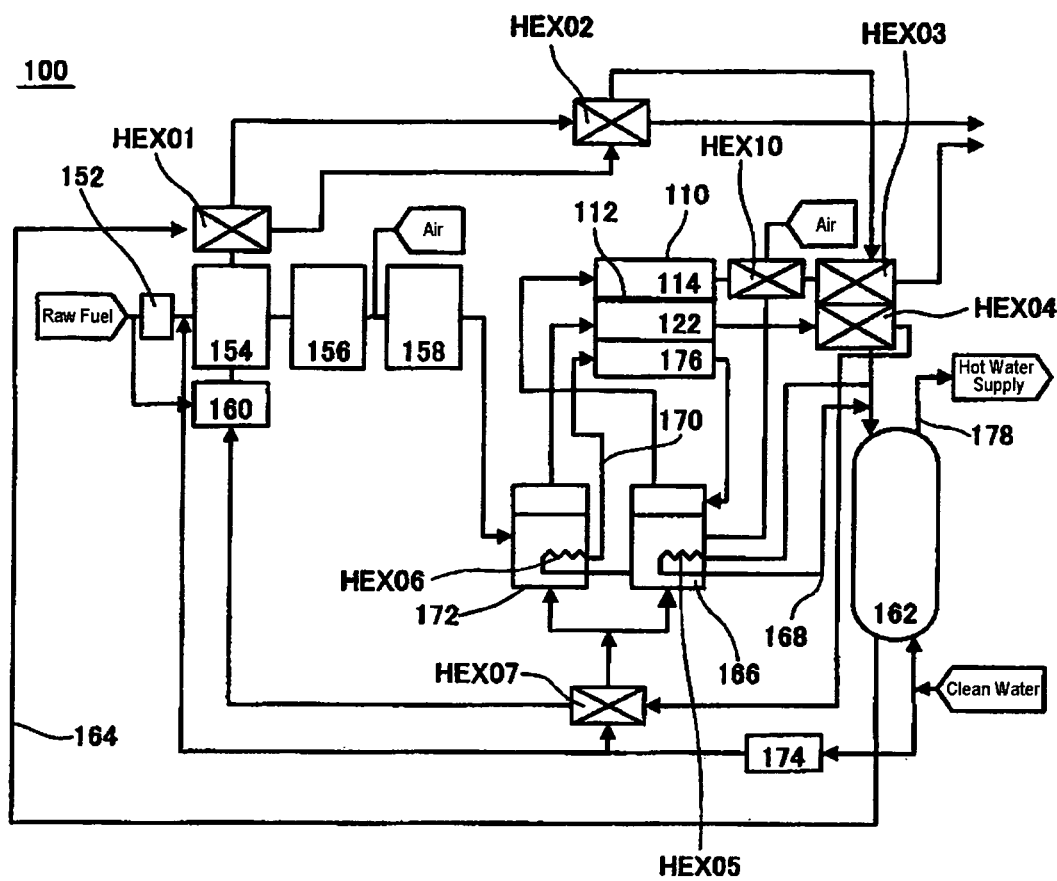
FIG. 2 is an illustrative view of a fuel cell used in a domestic fuel cell cogeneration system as one example of a fuel cell system according to the present invention.

The domestic fuel cell cogeneration system 100, as shown in FIG. 2, comprises a reforming device for reforming a raw fuel (hydrocarbon fuel) such as LPG or city gas to generate a reformed gas containing about 80% hydrogen (fuel); a fuel cell 110 for generating electric power by use of the reformed gas supplied from the reforming device and atmospheric oxygen (oxidizer); and a hot water storage device for recovering and storing heat generated from the reforming device or the fuel cell 110 in the form of hot water (water of 40° C. or higher), and has both generating function and hot water supply function.

The raw fuel such as LPG or city gas set in homes is generally scented with a sulfide as a safety measure to gas leak. However, since this sulfide deteriorates catalyst within the reforming device, the sulfide in the raw fuel is removed by a desulfurizer 152 first in the reforming device.

The raw material desulfurized by the desulfurizer 152 is mixed with steam, steam-reformed by a reformer 154, and introduced to a converter 156. The converter 156 generates a reformed gas composed of about 80% hydrogen ($H_2$), about 20% carbon dioxide ($CO_2$) and 1% or less carbon monoxide (CO). In this system 100 adapted to supply the reformed gas to the fuel cell 110 which is operated at low temperature (100° C. or lower) susceptible to CO, the reformed gas can be further mixed with oxygen to selectively oxidize CO by a CO remover 158. The CO concentration in the reformed gas can be reduced to 10 ppm or less by the CO remover 158 which is optionally provided. It is difficult to reduce CO to a trace amount.

The reforming device comprises at least the reformer 154 and the converter 156, and further comprises the desulfurizer 152 when the gas set in homes is used as the raw fuel, as in this system 100, and the CO remover 158 when a low-temperature type fuel cell such as a solid polymer type fuel cell is used as the fuel cell 110.

Since the steam reforming is an endothermic reaction, the reformer 154 is provided with a burner 160. When the reforming device is started, the raw material is supplied also to the burner 160 to raise the temperature of the reformer 154, and when the system 100 is laid in a stably operable state, the supply of raw fuel to the burner 160 is stopped, and unreacted fuel discharged from the fuel cell 110 is supplied to the burner 160 to thereby supply heat to the reformer 154.

Exhaust air after supplying the heat to the reformer 154 by the burner 160 is heat-exchanged with water in a hot water storage tank 162 through heat exchangers HEX01 and HEX02 since the exhaust air still retains a large quantity of heat.

The resulting water is heat-exchanged (HEX03) with exhaust gas from an air electrode (cathode) 114 of the fuel cell 110, then heat-exchanged (HEX04) with exhaust gas from a fuel electrode (anode) 122, and returned to the hot water storage tank 162.

A water pipe 164 passing through the heat exchangers HEX01, HEX 02, HEX03 and HEX04 comprises a branch pipe 168 so that the temperature of water (hot water) passed through the heat exchanger HEX04 can be used to heat or cool an air electrode (cathode)-side humidifying tank 166.

When the temperature of the air electrode (cathode)-side humidifying tank 166 is low at the starting of the system 100 or the like, the water passed through the heat exchanger HEX04 is carried to the heat exchanger HEX05 through the branch pipe 168 to supply the heat thereof to the air electrode (cathode)-side humidifying tank 166 therein, and then returned to the hot water storage tank 162.

The air electrode (cathode)-side humidifying tank 166 functions also as a cooling water tank, and water in the air electrode (cathode)-side humidifying tank 166 cools the fuel cell 110 and returns to the air electrode (cathode)-side humidifying tank 166.

When the temperature of the fuel cell 110 is low at the starting of the system 100 or the like, the fuel cell 110 can be warmed by supplying cooling water warmed by the heat exchanger HEX05 to the fuel cell 110 as described above.

A cooling water flow passage 170 for distributing the cooling water is connected with a heat exchanger HEX06 provided on a fuel electrode (anode)-side humidifying tank 172, and the cooling water also plays the role of making the temperature of the fuel electrode (anode)-side humidifying tank 172 substantially equal to that of the air electrode (cathode)-side humidifying tank 166. Denoted at 176 is a cooling part.

The reformed gas from the reforming device is humidified (bubbled in the system 100) in the fuel electrode (anode)-side humidifying tank 172 and supplied to the fuel electrode (anode) 122. Unreacted fuel which did not contribute to generation of electric power in the fuel electrode (anode) 122 is discharged out of the fuel cell 110 and supplied to the burner 160. Denoted at 112 is a polymer electrolyte membrane.

This fuel cell 110 is generally operated to perform generation of electric power in a temperature range of 70 to 90° C., and the exhaust gas discharged out of the fuel cell 110 has heat of about 80° C. Therefore, the exhaust gas is heat-exchanged in the heat exchanger HEX04 as described above, further heat-exchanged in a heat exchanger HEX07 to heat the water supplied to the air electrode (cathode)-side humidifying tank 166 and the fuel electrode (anode)-side humidifying tank 172, and then supplied to the burner 160.

Since the water supplied to the air electrode (cathode)-side humidifying tank 166 and the fuel electrode (anode)-side humidifying tank 172 is desirably clean water with low conductivity and minimized inclusion of organic matter, clean water from public water supply is subjected to water treatment by a reverse osmosis membrane and an ion exchange resin in a water treatment device 174 prior to the supply.

The water subjected to water treatment is used also for steam reforming in the reformer 154. The clean water is supplied also to the hot water storage tank 162. At this time, the clean water is supplied from a lower part of the hot water storage tank 162. The water pipe 164 also extracts water of low temperature from the lower part of the hot water storage tank 162, and returns the water heat-exchanged in each heat exchanger to an upper part of the tank.

A heat exchanger HEX10 is a total heat exchanger. Since exhaust gas including unreacted oxygen which did not contribute to power generation in the air electrode (cathode) 114 contains heat of about 80° C. and generation water generated by reaction, the total heat exchanger HEX10 supplies the heat and moisture to the air supplied to the air electrode (cathode) 114.

The air supplied to the air electrode (cathode) 114 is further humidified (bubbled in the system 100) in the air electrode (cathode)-side humidifying tank 166, and then supplied to the air electrode (cathode) 114, while the exhaust gas which supplied the heat and moisture in the total heat exchanger HEX10 is further heat-exchanged in the heat exchanger HEX03 and then discharged out of the system 100.

The fuel cell 110 of this embodiment comprises gas diffusion layers 120 and 128, from the viewpoint that reaction gas can be uniformly supplied to the air electrode (cathode) 114 and to the fuel electrode (anode) 122, and the generation water from the air electrode (cathode) 114 or condensate water condensed in the air electrode (cathode) 114 and the fuel electrode (anode) 122 can be quickly discharged to the outside.

The gas diffusion layers are produced respectively by using a woven fabric or nonwoven fabric of carbon paper or carbon as a substrate and applying a viscous carbon paste mainly composed of carbon black to the substrate.

In view of productivity, the same carbon paper is used as substrates 118 and 126 of both the gas diffusion layers 120 and 128, as shown in FIG. 3, and the gas diffusion layer paste to be applied to the substrate is varied between the air electrode (cathode) side and the fuel electrode (anode) side.

Concretely, an air electrode (cathode)-side filling layer 116 produced through application/drying/heat treatment of the air electrode (cathode)-side diffusion layer paste to the air electrode (cathode)-side substrate is made to have lower water repellency (low fluorine resin content), compared with the fuel electrode (anode) side.

On the other hand, a fuel electrode (anode)-side filling layer 124 produced through application/drying/heat treatment of the fuel electrode (anode)-side diffusion layer paste to the fuel electrode (anode)-side substrate is made to have higher water repellency (high fluorine resin content).

However, when general fluorine resin (hereinafter referred to as polymer fluorine resin) is added to the gas diffusion layer paste in a large quantity, the paste is increased in viscosity and clustered in the course of mixing work or application work because the polymer fluorine resin has binding property.

This makes the application process extremely difficult. Therefore, a low-molecular fluorine resin with an average molecular weight smaller than that of the polymer fluorine resin, having extremely low binding property is adapted to make the low-molecular fluorine resin and the polymer fluorine resin bear the water repellency and the binding property, respectively, so that the respective gas diffusion layer pastes have well-balanced water repellency and binding property.

Concretely, carbon paper that is the substrate of the gas diffusion layer (made by TORAY INDUSTRIES, INC.: TGPH 060H) is dipped in FEP dispersion so that the ratio of carbon paper:FEP (tetrafluoroethylene-hexafluoropropylene copolymer) by mass is 95:5 (for air electrode) or 60:40 (for fuel electrode), dried at 60° C. for 1 hour, and heat-treated at 380° C. for 15 minutes (FEP water repelling treatment). The carbon paper is thereby made water repellent substantially in a uniform way.

Then, carbon black (made by CABOT CO.: Vulcan XC72R), terpineol (made by KISHIDA CHEMICAL CO., LTD.) as solvent, and nonionic surfactant Triton (made by KISHIDA CHEMICAL CO., LTD.) are mixed together so that the ratio by mass is carbon black:terpineol:Triton=20: 150:3, and mixed homogenously at ordinary temperature for 60 minutes by a versatile mixer (made by DALTON CO.) to thereby prepare a carbon paste.

Low-molecular fluorine resin (made by DAIKIN INDUSTRIES, LTD.: Luburon LDW 40E) and polymer fluorine resin (made by DuPont: PTFE 30J) are mixed together so that the ratio by mass of the fluorine resin contained in the dispersion is low-molecular fluorine resin:polymer fluorine resin=20:3 to thereby prepare a mixed fluorine resin for cathode.

This carbon paste is put into a hybrid mixer container, and cooled until the temperature of the carbon paste becomes 10 to 12° C. The above-mentioned mixed fluorine resin for air electrode (cathode) is added to the cooled carbon paste so that the ratio by mass of the carbon paste:the mixed fluorine resin for air electrode (cathode) (the fluorine resin content contained in the dispersion) is 31:1, and mixed for 12 to 18 minutes in a mixing mode of a hybrid mixer (made by KEYENCE CO.: EC 500).

The mixing time is appropriately adjusted so that the mixing is stopped when the temperature of the paste reaches 50 to 55° C. The hybrid mixer is switched from the mixing mode to a defoaming mode after the temperature of the paste reaches 50 to 55° C., and defoaming is performed for 1 to 3 minutes. The defoamed paste is naturally cooled to thereby complete a cathode diffusion layer paste.

The above-mentioned carbon paste and the low-molecular fluorine resin are put into a hybrid mixer container so that the ratio by mass of the carbon paste:the low-molecular fluorine resin (hereinafter referred to as fuel electrode fluorine resin) (the fluorine resin content in the dispersion) is 26:3, and mixed in the mixing mode of a hybrid mixer for 15 minutes.

After completion of mixing, the hybrid mixer is switched from the mixing mode to the defoaming mode, and defoaming is performed for four minutes. The resulting paste is naturally cooled, after disposing supernatant solution, if collected in an upper portion of the defoamed paste, to thereby complete a fuel electrode diffusion layer paste.

Each of the gas diffusion layer pastes cooled to ordinary temperature is applied onto a surface of above-mentioned carbon paper subjected to FEP water repelling treatment so that the application state within the carbon paper surface is uniformed, and dried at 60° C. for 60 minutes by a hot air dryer (made by THERMAL). Finally, heat treatment is performed at 360° C. for 2 hours to thereby complete the respective gas diffusion layers.

In the fuel electrode (anode) 122, a second alloy catalyst [Pt:Ru:Co (1:0.9:1 by mass)/carbon-supported C] obtained by partially substituting ruthenium of a platinum-ruthenium first alloy catalyst [Pt:Ru (1:1 by mass)/carbon-supported C] by a metal M lower dissolving potential than ruthenium (cobalt) is used.

The second alloy catalyst is represented by any one of general formulae Pt—$Ru_x$-$M_{(1-x)}$ (provided that $0<x<1$), Pt—$Ru_x$-$M_{(1.5-x)}$ (provided that $0<x<1.5$) and Pt—$Ru_x$-$M_{(2-x)}$ (provided that $0<x<2$).

A unit cell including the electrode/membrane assembly with gas diffusion layer shown in FIG. 3 was assembled, a fuel cell was produced using such cells, and power generation test was performed thereto by supplying a saturatedly humidified simulated reformed gas (hydrogen 80%, carbon dioxide 20%, carbon monoxide 10 ppm) to the fuel electrode and saturatedly humidified air to the air electrode at a cell temperature of 70.degree. C. As the second alloy catalyst, a one represented by the general formula Pt—$Ru_{(1-x)}$-$M_x$ (provided that $0<x<1$) was used. As the lower dissolving potential metal M, Mo, Co, W and Ni were used. The result is shown in FIG. 4.

Figure 4:
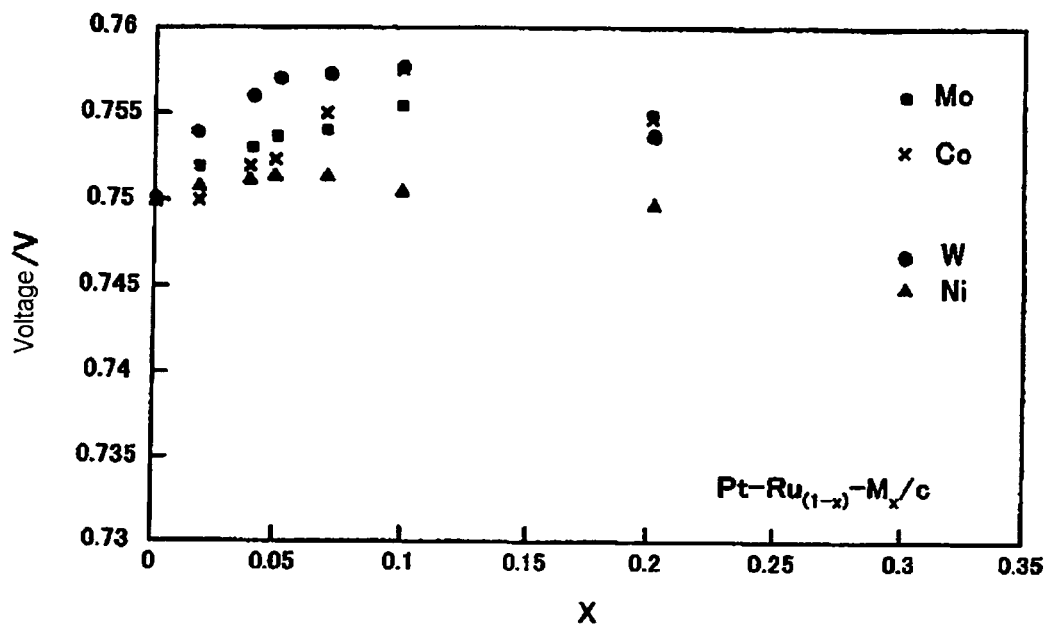
FIG. 4 is a graph showing voltage change (vertical axis) to X (horizontal axis) ranging from 0 to 0.35 in a condition of current density 0.3 A/cm$^2$.

FIG. 4 is a graph showing voltage change (vertical axis) to X (horizontal axis) ranging from 0 to 0.35 in a condition of current density 0.3 A/cm².

As is apparent from FIG. 4, the effect is exhibited at a ratio of the lower dissolving potential metal or X≈0.01 to 0.3, and X≈0.1 is particularly preferred, or the substation ratio of the lower dissolving potential metal M of about 0.1 is particularly preferred.

When the fuel cell 110 involves inclusion of CO to the fuel electrode (anode) 122, CO is contained in the reformed gas in an amount of several ppm, and this CO has the property of easily adhering to Pt of the catalyst. The adhesion of CO to Pt causes deterioration of the activity as catalyst of Pt, so that the fuel electrode (anode) 122 is laid in an overvoltage state (20 mV to 30 mV).

Ru has the property of extracting O or OH necessary for changing CO to $CO_2$ which never affects the catalyst from humidified water ($H_2O$) or the like supplied together with the reformed gas. Therefore, even if CO is adhered to Pt, the Ru adjacent thereto can extract O or OH to change the CO to $CO_2$.

However, previous studies found that Pt—Ru becomes single Pt due to partial dissolution of Ru therein during repeated operations of starting/stoppage or the like, resulting in deterioration of CO resistance.

In the present embodiment, the deterioration of CO resistance can be successfully suppressed by using, in the fuel electrode 122, Pt—Ru—Co second alloy [Pt:Ru:Co (1:0.9:0.1 by mass)/carbon-supported] catalyst for a first layer on the polymer electrolyte membrane 112 side and Pt—Ru first alloy/carbon-supported catalyst for a second layer.

For the first layer, the Pt—Ru—Co second alloy [Pt:Ru:Co (1:0.9:0.1 by mass)/carbon-supported] catalyst is mixed with electrolyte solution in a ratio of Pt—Ru—Co second alloy [Pt:Ru:Co/carbon-supported] catalyst:electrolyte solution=3:8 to prepare a fuel electrode slurry.

For the second layer, the Pt—Ru first alloy [Pt:Ru=1:1 by mass]/carbon-supported catalyst is mixed with electrolyte solution in a ratio of Pt—Ru first alloy/carbon-supported catalyst:electrolyte solution=3:8 to prepare a fuel electrode slurry.

A Pt/carbon-supported catalyst is mixed with electrolyte solution in a ratio of Pt/carbon-supported catalyst:electrolyte solution=3:8 to prepare an air electrode slurry. The prepared air electrode slurry is applied to the surface where the filling layer 116 is formed by applying the gas diffusion layer paste onto the substrate 118 of the gas diffusion layer 120 to thereby produce an air electrode.

The solid polymer membrane 112 is sandwiched between the fuel electrode (anode) and the air electrode (cathode), and hot-pressed at about 140° C. to thereby produce the fuel cell 110.

As a result of power generation test for the resulting fuel cell 110, long-time generation of electric power could be performed over 20000 hours by supplying saturatedly humidified simulated modified gas (hydrogen 80%, carbon dioxide 20%, carbon monoxide 10 ppm) to the fuel electrode and saturatedly humidified air to the air electrode at a cell temperature of 70° C.

A fuel cell 110 was produced in the same manner as described above, except using nickel as the metal M lower dissolving potential than ruthenium and subjected to power generation test. This fuel cell also could perform long-term power generation over 20000 hours by supplying saturatedly humidified simulated reformed gas (hydrogen 80%, carbon dioxide 20%, carbon monoxide 10 ppm) to the fuel cell and saturatedly humidified air to the air electrode at a cell temperature of 70° C.

In addition to the above-mentioned cobalt, nickel, molybdenum and tungsten, fuel cells were produced in the same manner using lead, iron and chromium, and subjected to long-term power generation test. As a result, substantially the same results were obtained therefor.

For comparison, the same long-term power generation test was performed to a fuel cell produced in the same manner, except that the catalyst layer of the fuel electrode is composed of only the first alloy catalyst layer (or platinum-ruthenium alloy/carbon-supported catalyst).

As a result, stable generation could not be performed over a long time since the voltage was reduced after the lapse of about 10000 to 15000 hours.

Further, the same long-term power generation test was performed to a fuel cell produced in the same manner, except that the catalyst layer of the fuel electrode is composed of only platinum/carbon-supported catalyst layer. As a result, stable power generation could not be performed over a long time since the voltage was reduced after the lapse of about 2500 hours.

Second Embodiment

Figure 5:
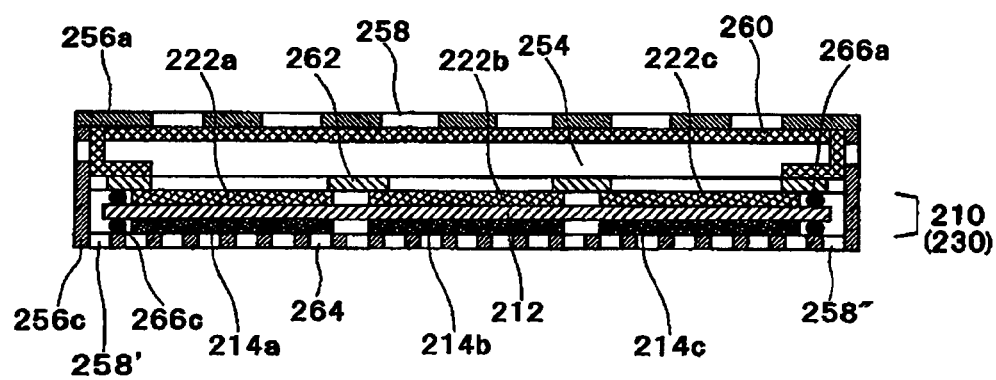
FIG. 5 is an illustrative view of a fuel cell used in a portable fuel cell system as another example of the fuel cell system of the present invention.

In this embodiment, a fuel cell 210 used in a portable fuel cell system 200 as another example of the fuel cell system of the present invention will be described in reference to FIG. 5.

The fuel cell 210 is a direct methanol fuel cell (DMFC) which is adapted to supply a methanol aqueous solution or pure methanol (hereinafter referred to as "methanol fuel") to a fuel electrode (anode) 222 (222a, 222b, 222c), wherein the power generation part of the fuel 210 is composed of a catalyst coated membrane (CCM) 230 which is formed by sandwiching a polymer electrolyte membrane 212 between an air electrode (cathode) 214 (214a, 214b, 214c) and the fuel electrode (anode) 222 without any diffusion layers.

The methanol fuel supplied to the fuel electrode (anode) 222 is supplied to a fuel chamber 254 through a methanol fuel supply port (not shown) from the outside of the fuel cell 210, stored in the fuel chamber 254, and then supplied to each fuel electrode (anode) 222.

The fuel electrode (222) undergoes a reaction of methanol as shown by the following expression, in which H⁺ moves to the air electrode (cathode) 214 through the solid polymer membrane 212, and the air electrode (cathode) 214 undergoes a reaction as shown by the following expression to thereby take out electric power.

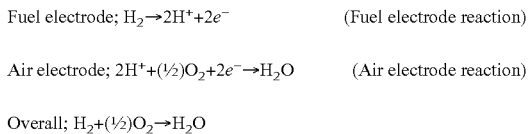

Fuel electrode; $H_2 \rightarrow 2H^+ + 2e^-$ (Fuel electrode reaction)

Air electrode; $2H^+ + (½)O_2 + 2e^- \rightarrow H_2O$ (Air electrode reaction)

Overall; $H_2 + (½)O_2 \rightarrow H_2O$

Figure 6:
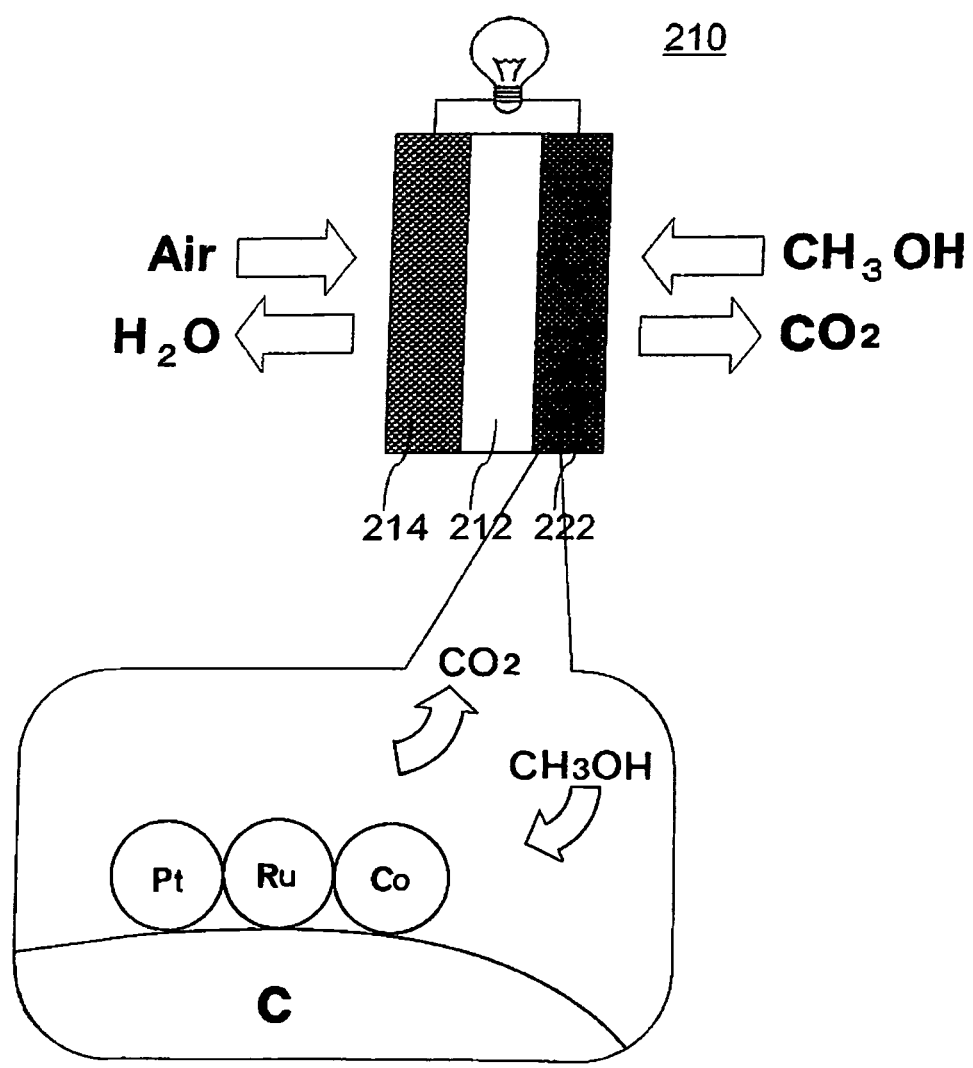
FIG. 6 is an illustrative view, schematically showing the state of fuel electrode reaction in a fuel electrode and air electrode reaction in an air electrode.
Figure 7:
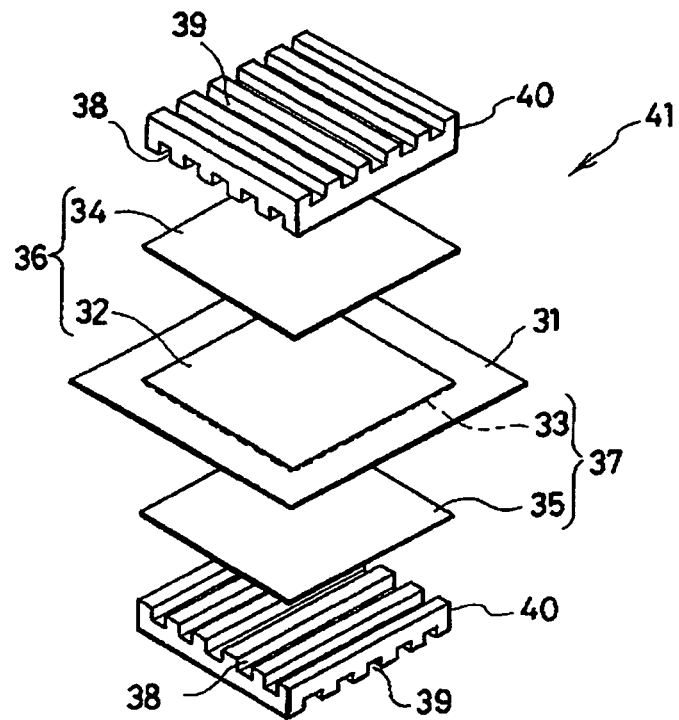
FIG. 7 is an exploded sectional view, showing a basic structure of a unit cell for polymer type fuel cell.
Figure 8:
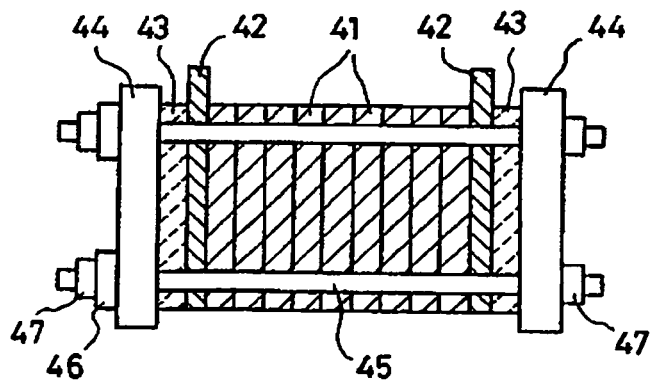
FIG. 8 is a sectional view, showing a basic structure of a polymer type fuel cell stack.
Figure 9:
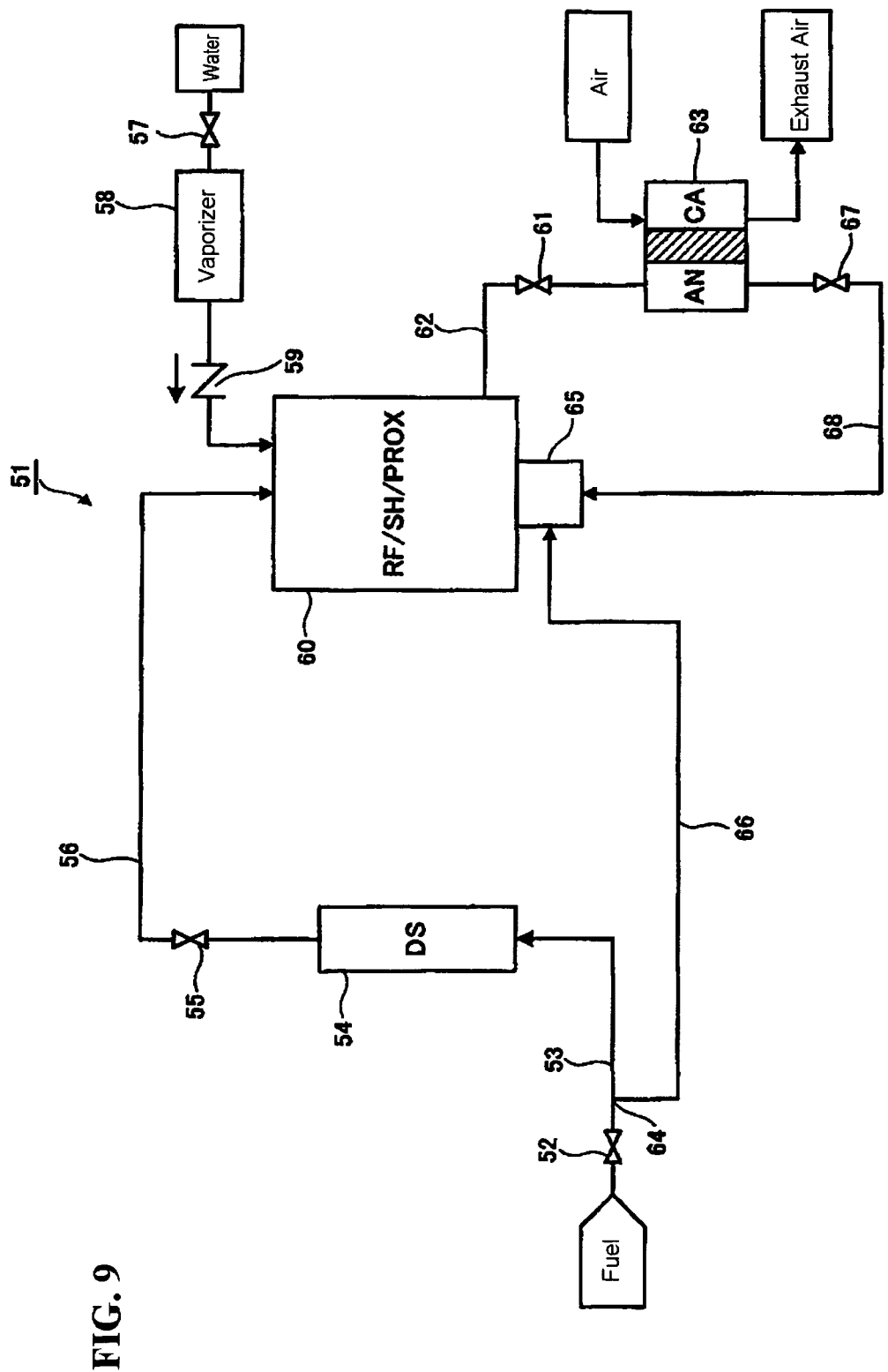
FIG. 9 is an illustrative view of a conventional fuel cell power generation system.

FIG. 6 schematically illustrates the states of the fuel electrode reaction in the fuel electrode 222 and the air electrode reaction in the air electrode.

As is also apparent from the above-mentioned expressions, carbon dioxide generates from the fuel electrode (anode) 222 by the reaction. Therefore, a gas-liquid separating filter 260 is disposed between the fuel chamber 254 and a plurality of fuel electrode (anode)-side product discharge ports 258 provided on a fuel electrode (anode)-side casing 256a of the portable fuel cell system 200.

The gas-liquid separating filter 260 is a flat filter having fine pores which selectively transmit gas component but not liquid component. The filter is suitably formed of a material having methanol (alcohol) resistance.

The casing 256 [fuel electrode (anode)-side casing 256a, air electrode (cathode)-side casing 256c] is suitably formed of a lightweight and rigid material having corrosion resistance, for example, a synthetic resin or a metal such as aluminum alloy, titanium alloy or stainless steel. Reinforced glass or skeleton resin can be also used.

Since the casing 256 has a portion contacting with methanol fuel which is similar in construction to the gas-liquid separating filter 260, a composite material obtained by laminating a fluorine synthetic resin on the above-mentioned synthetic resin or metal is preferably used for the portion contacting with methanol fuel in particular. Denoted at 262 is a support member which forms the fuel chamber 254 and clamps the CCM 230, and the support member 262 is also preferably formed of the same material as that of the portion contacting with methanol fuel of the casing 256.

Air is supplied to the air electrode (cathode) 214 through a plurality of air electrode (cathode)-side product discharge ports 264, and oxygen in the air reacts with H⁺ which is moved to the air electrode (cathode) 214 through the polymer electrolyte membrane 212 to thereby generate generation water.

The air electrode (cathode)-side product discharge ports 264 for discharging the generation water from the air electrode (cathode) 214 in addition to the supply of air to the air electrode (cathode) 214 are provided so as to be substantially equal to the fuel electrode (anode)-side product discharge ports 258 in the total area, but are smaller in pore diameter and larger in pore number than the fuel electrode (anode)-side product discharge ports 258.

Each inner wall of the air electrode (cathode)-side product discharge ports 264 and the surface of the air electrode (cathode)-side casing 256c on which the air electrode (cathode)-side product discharge ports 264 are formed are covered with a functional coating material containing a photocatalyst such as titanium oxide.

By arranging a number of small pores as the air electrode (cathode)-side product discharge ports, dropping of the generation water discharged from the air electrode (cathode) 214 can be eliminated. Further, by coating the inner wall with the functional coating material, the generation water can be thinly spread over the inner wall surface without clogging the pores and easily evaporated, and propagation of microorganisms or the like can be also prevented.

The functional coating material preferably contains a metal such as silver, copper or zinc so that organics decomposing function or antibacterial function can take effect even if light such as solar light containing a specific wavelength at which the photocatalyst functions is not emitted to the portable fuel cell system 200.

Further, the whole surface of the casing 256 is covered with the functional coating material to decompose organic matters adhered to the portable fuel cell system 200 by a user's touch on the portable fuel cell system 200, whereby contamination-preventing function or antibacterial function can be given to the portable fuel cell system 200.

For preventing inflow of methanol fuel from the fuel electrode (anode) 222 to the air electrode (cathode) 214, O-rings 266 (fuel electrode (anode)-side O-ring 266a, air electrode (cathode)-side O-ring 266c) are disposed so as to surround the CCM 230.

In this embodiment, the O-rings 266 are pressed by the air electrode (cathode)-side casing 256c and the support member 262 to prevent the inflow of methanol fuel from the fuel electrode (anode) 222 to the air electrode (cathode) 214 and also to prevent inflow of oxygen to the fuel electrode (anode) 222. The O-rings 266 desirably have flexibility and corrosion resistance.

In the fuel electrode (anode) 222, Pt—Ru—Co second alloy [Pt:Ru:Co (1:0.9:0.1 by mass)/carbon-supported] catalyst is used for a first layer on the polymer electrolyte membrane 212 side, and Pt—Ru first alloy/carbon-supported catalyst is used for a second layer. The thickness ratio of the first layer to the second layer is adjusted to first layer:second layer=1:10.

For the fuel electrode (anode) 222, the Pt—Ru—Co second alloy/carbon-supported catalyst is mixed with electrolyte solution in a ratio of Pt—Ru—Co second alloy/carbon-supported catalyst:electrolyte solution=1:2 to prepare a fuel electrode (anode) slurry. The fuel electrode (anode) slurry is applied to one surface of a polymer electrolyte membrane (Nafion 115, made by DuPont).

For the air electrode (cathode) 214, Pt/carbon-supported catalyst is mixed with electrolyte solution in a ratio of Pt/carbon-supported catalyst:electrolyte solution=3:8 to prepare an air electrode (cathode) slurry. The air electrode (cathode) slurry is applied to the other surface of the polymer electrolyte membrane 212 to thereby produce the fuel cell 210.

Using the thus-produced fuel cell 210 with electrode/membrane assembly (MEA), long-term power generation test was performed over 3500 hours or more by supplying methanol to the fuel electrode and supplying saturatedly humidified air to the air electrode at a cell temperature of 50° C.

As a result of the long-term power generation test, generation of electric power could be stably performed over about 3500 hours.

A fuel cell 210 was produced in the same manner, except using nickel as the metal M lower dissolving potential than ruthenium. Using this fuel cell 210, long-term generation test was performed over 3500 hours or more by supplying methanol to the fuel electrode and supplying saturatedly humidified air to the air electrode at a cell temperature of 50° C. As a result, generation of electric power could be stably performed over 3500 hours or more.

For comparison, the same long-term generation test was performed to a fuel cell produced in the same manner except that the catalyst layer of the fuel electrode is composed of only the first alloy catalyst layer (or platinum-ruthenium alloy/carbon-supported catalyst).

As a result, generation of electric power could not be stably performed over a long time since the voltage was reduced after the lapse of about 2500 hours.

For comparison, further, the same long-term generation test was performed to a fuel cell produced in the same manner except that the catalyst layer of the fuel electrode is composed of only a platinum/carbon-supported catalyst layer. As a result, stable generation of electric power could not be performed over a long time since the voltage was reduced after the lapse of about 1500 hours.

The above-mentioned preferred embodiments of the invention are illustrative and not restrictive, and the scope of the invention and the patent claims of the invention are never defined thereby. Each component of the invention can be variously modified beyond the preferred embodiments without departing from the spirit and scope of the invention.

INDUSTRIAL APPLICABILITY

According to the fuel electrode catalyst for fuel cell of the present invention which comprises a platinum-ruthenium first alloy catalyst and a second alloy catalyst obtained by partially substituting ruthenium of the platinum-ruthenium first alloy catalyst by a metal lower dissolving potential than ruthenium, the catalytic activity of the fuel electrode can be maintained without deterioration of CO poisoning resistance since the metal lower dissolving potential than ruthenium of the fuel electrode is eluted first during operation due to the presence of the second alloy catalyst in which ruthenium of the platinum-ruthenium first alloy catalyst is partially substituted by the metal lower dissolving potential than ruthenium, and ruthenium is trapped within the fuel electrode catalyst layer without elution. Further, inhibition of the oxygen reduction as air electrode reaction by eluted ruthenium can be prevented, and the oxygen reducing efficiency of platinum can also be enhanced by the lower dissolving potential metal eluted instead of ruthenium. This fuel electrode catalyst thus has high industrial feasibility with various remarkable effects.

What is claimed is:

1. An electrode/membrane assembly for a fuel cell, comprising a fuel electrode bonded to one surface of a polymer electrolyte membrane and an air electrode bonded to the other surface of the polymer electrolyte membrane,
wherein the fuel electrode comprises:
a first catalyst layer consisting of a platinum-ruthenium alloy first catalyst supported by carbon, in which platinum Pt and ruthenium Ru are included at a mass % of Pt:Ru=10-95:5-90, wherein Pt+Ru=100 and,
a second catalyst layer laminated to both the first catalyst layer and the polymer electrolyte membrane, the second catalyst layer consisting of a platinum-ruthenium-metal (M) alloy second catalyst, in which platinum Pt, ruthenium Ru and the metal M are included at a mass % of Pt:Ru:M=10-95:1-90:0.001-30, wherein:

Pt+Ru+M=100, the second catalyst is supported by carbon and laminated to the polymer electrolyte membrane, and
the metal (M) has a lower dissolving potential than ruthenium.

2. The electrode/membrane assembly according to claim 1, wherein the second alloy catalyst is a ternary alloy catalyst obtained by partially substituting ruthenium of the platinum-ruthenium alloy by the metal (M) with the lower dissolving potential than ruthenium.

3. The electrode/membrane assembly according to claim 1, wherein the carbon is at least one selected from the group consisting of acetylene black, ketjen black, furnace black, graphitized carbon, carbon nanotube, and carbon nanoonion.

4. The electrode/membrane assembly according to claim 1, wherein the metal with the lower dissolving potential than ruthenium is at least one selected from the group consisting of cobalt, nickel, molybdenum, lead, iron, tungsten, and chromium.

5. The electrode/membrane assembly for the fuel cell according to claim 1, wherein the fuel electrode further comprises a ruthenium catalyst layer laminated to the first catalyst layer so as to be enabled to replenish ruthenium to the first catalyst layer and the second catalyst layer during an operation of the fuel cell.

6. An electrode/membrane assembly for the fuel cell according to claim 1, wherein a thickness of the second catalyst layer is equal to or more than 0.01 times of a thickness of the first catalyst layer, and equal to or less than 2 times of the thickness of the first catalyst layer.

7. An electrode/membrane assembly for the fuel cell according to claim 1, wherein a mass of the first catalyst of the first catalyst layer is 1 times or more than a mass of the second catalyst of the second catalyst layer and 10 times or less than the mass of the second catalyst of the second catalyst layer.

8. An electrode/membrane assembly for the fuel cell according to claim 1, wherein concentration of platinum in the second alloy catalyst is equal to or more than a concentration of platinum in the first alloy catalyst.

9. An electrode/membrane assembly for the fuel cell according to claim 1,
wherein the carbon is at least one selected from the group consisting of acetylene black, ketjen black, furnace black, graphitized carbon, carbon nanotube, and carbon nanoonion;
the metal with the lower dissolving potential than ruthenium is at least one selected from the group consisting of cobalt, nickel, molybdenum, lead, iron, tungsten, and chromium; and
the fuel electrode further comprises a ruthenium catalyst layer laminated to the first catalyst layer so as to be enabled to replenish ruthenium to the first catalyst layer and the second catalyst layer during an operation of the fuel cell.

10. An electrode/membrane assembly for the fuel cell according to claim 1,
wherein a thickness of the second catalyst layer is equal to or more than 0.01 times of a thickness of the first catalyst layer, and equal to or less than 2 times of the thickness of the first catalyst layer;
a mass of the first catalyst of the first catalyst layer is 1 times or more than a mass of the second catalyst of the second catalyst layer and 10 times or less than the mass of the second catalyst of the second catalyst layer; and
the fuel electrode further comprises a ruthenium catalyst layer laminated to the first catalyst layer so as to be enabled to replenish ruthenium to the first catalyst layer and the second catalyst layer during an operation of the fuel cell.

11. A fuel cell, comprising the electrode/membrane assembly according to claim 1.

12. A fuel cell apparatus, which uses a fuel containing a small amount of CO as a fuel supplied to the fuel electrode of the fuel cell according to claim 11.

13. A fuel cell apparatus, which comprises the fuel cell according to claim 11 and a hot water tank for recovering and storing heat generated from the fuel cell in a form of hot water.

* * * * *